United States Patent
Anima et al.

(10) Patent No.: US 10,558,950 B2
(45) Date of Patent: Feb. 11, 2020

(54) AUTOMATIC CONTEXT PASSING BETWEEN APPLICATIONS

(71) Applicant: Google Inc., Mountain View, CA (US)

(72) Inventors: Mario Anima, Sunnyvale, CA (US); Farzad Khosrowshahi, Pleasantville, NY (US); Genevieve Cuevas, Sunnyvale, CA (US); Liu Liu, San Francisco, CA (US); Lucas Pettinati, San Jose, CA (US)

(73) Assignee: Google LLC, Mountain View, CA (US)

( * ) Notice: Subject to any disclaimer, the term of this patent is extended or adjusted under 35 U.S.C. 154(b) by 84 days.

(21) Appl. No.: 15/595,532

(22) Filed: May 15, 2017

(65) Prior Publication Data

US 2018/0330329 A1    Nov. 15, 2018

(51) Int. Cl.

| | |
|---|---|
| *G06Q 10/10* | (2012.01) |
| *G06F 3/0484* | (2013.01) |
| *G06F 3/0481* | (2013.01) |
| *G06F 9/54* | (2006.01) |
| *G06F 16/48* | (2019.01) |

(52) U.S. Cl.
CPC ......... *G06Q 10/107* (2013.01); *G06F 3/0481* (2013.01); *G06F 3/0484* (2013.01); *G06F 9/543* (2013.01); *G06F 16/48* (2019.01)

(58) Field of Classification Search
CPC ...... G06F 9/543; G06F 3/0481; G06F 3/0484; G06Q 10/10
See application file for complete search history.

(56) References Cited

U.S. PATENT DOCUMENTS

| | | | |
|---|---|---|---|
| 7,913,191 B2 | 3/2011 | Asakawa et al. | |
| 8,423,405 B1* | 4/2013 | Gopalratnam | G06Q 30/00 705/14.4 |
| 8,584,149 B2 | 11/2013 | Crucs | |
| 8,656,265 B1* | 2/2014 | Paulin | G06F 17/30899 715/205 |
| 2004/0172584 A1 | 9/2004 | Jones et al. | |
| 2005/0066335 A1 | 3/2005 | Aarts | |
| 2006/0150088 A1 | 7/2006 | Kraft et al. | |

(Continued)

OTHER PUBLICATIONS

U.S. Appl. No. 15/851,090, filed Dec. 21, 2017, naming inventors Anima et al.

(Continued)

*Primary Examiner* — Tuan C Dao
(74) *Attorney, Agent, or Firm* — Shumaker & Sieffert, P.A.

(57) ABSTRACT

In general, the disclosure is directed to a computing device configured to identify and display information determined to be relevant to a current task. The computing device receives information associated with a content page for a second application, at least a portion of which is included in a graphical user interface. The computing device determines, based on the information, a context of the second application. The computing device determines, based on the context, a set of objects for each of one or more applications related to the second application. The computing device generates a content page for the first application including graphical indications of at least one object from at least one of the respective sets of objects. The computing device outputs, for display, at least a portion of the content page for the first application within the graphical user interface.

20 Claims, 6 Drawing Sheets

(56) References Cited

U.S. PATENT DOCUMENTS

| | | |
|---|---|---|
| 2009/0006448 A1 | 1/2009 | Pall et al. |
| 2010/0185696 A1 | 7/2010 | Eggebraaten et al. |
| 2012/0030275 A1* | 2/2012 | Boller .................. G06F 16/9574 709/203 |
| 2013/0159984 A1 | 6/2013 | Misovski et al. |
| 2013/0339980 A1 | 12/2013 | Meshar et al. |
| 2014/0136528 A1 | 5/2014 | Anima et al. |
| 2014/0380142 A1 | 12/2014 | Mikutel et al. |
| 2015/0012830 A1 | 1/2015 | Choi et al. |
| 2016/0142358 A1* | 5/2016 | Zunger .................. G06Q 50/01 709/206 |
| 2016/0371249 A1 | 12/2016 | Chilakamarri et al. |
| 2017/0147568 A1 | 5/2017 | Chen et al. |

OTHER PUBLICATIONS

U.S. Appl. No. 62/563,609, filed Sep. 26, 2017, naming inventors Anima et al.

Paulheim, "Efficient Semantic Event Processing: Lessons Learned in User Interface Intergration," 2010, 15 pp. (Applicant points out, in accordance with MPEP 609.04(a), that the year of publication, 2010, is sufficiently earlier than the effective U.S. filing date, May 15, 2017, so that the particular month of publication is not in issue.).

Westenberg, "Drag and Drop Text Between Apps in Multi-window Mode [Diving into Android N]," retrieved from http://www.androidauthority.com/drag-and-drop-text-multi-window-android-n-679164/, Mar. 10, 2016, 3 pp.

Samsung, "Galaxy Note 4: Using Multi Window and Pop up Window," retrieved from http://www.samsung.com/sa_en/support/skp/faq/1063776, Apr. 30, 2016, 9 pp.

International Search Report and Written Opinion of International Application No. PCT/US2018/018025, dated Apr. 20, 2018, 14 pp.

International Preliminary Report on Patentability from International Application No. PCT/US2018/018025, dated Nov. 28, 2019, 9 pp.

\* cited by examiner

AUTOMATIC CONTEXT PASSING BETWEEN APPLICATIONS

BACKGROUND

Despite being able to simultaneously execute several applications, applications are designed to execute as isolated instances of the specific application and to change states upon the occurrence of an event (e.g., user input or satisfying some other requirement) within the specific instance of the application. Some applications are capable of communicating with other, different applications, but generally require explicit navigation to relevant data within the respective applications and additional user input to initiate the exchange of data between the applications. A user of a mobile computing device may have to provide input to switch between different application graphical user interfaces (GUIs) to complete a particular task. For example, a user of a computing device may have to cease entering text in a word processing application, provide input to cause the device toggle to a calendar application, manually navigate within the calendar application in order to locate any events that may be relevant to a text document being viewed in the word processing application, and provide still yet additional input at a GUI of the calendar application to select or recreate information that the user may want to finish editing the text document. Providing several inputs required by some computing devices to perform various tasks can be tedious, repetitive, and time consuming.

SUMMARY

In general, this disclosure is directed to techniques that may enable a computing device to identify and display information from various applications determined to be relevant to a task being performed using a currently executing application. For example, the computing device may initially execute an application and begin performing a task within that application. For instance, the computing device may execute an email application and the user may begin performing the task of drafting an email within the email application. The computing device may execute a companion application that identifies information typically associated with one or more other applications, the information being related to contextual information associated with the task being performed with the initially executed application. The contextual information may specify objects, people, events, etc. associated with the task being performed using the currently executing application. For instance, the contextual information may identify a recipient of the email being drafted, content within the body of the email being drafted, or any other information that may assist the computing device in identifying the details of the email. The companion application may retrieve numerous types of data objects from the one or more other applications, such as emails, documents, files, contact information, event information, or any other data stored at or accessible to the computing device. For instance, if the email includes contents referencing a particular event, the companion application may retrieve calendar information regarding the event, web results of an Internet search for the event, or documents related to a topic of the event. The computing device may display indications of the potentially relevant information within a window or frame visually positioned on top of, next to, or within the graphical user interface of the currently executing application. In response to detecting user input to select portions of the information, the computing device may provide the selected information to the initially executed application. The currently executing application may insert the selected portion of information within a portion GUI of the initially executed application related to the task being performed or otherwise perform a function within the initially executed application utilizing the information selected in the companion application.

By providing contextual information associated with the initially executed application to the companion application, techniques of this disclosure may provide a way for a user to quickly obtain documents, files, or any other data determined to be relevant to the task being performed using the application executing at the computing device without requiring the user to switch between several different applications, manually navigate to relevant content pages within the respective applications, or discern what input is necessary to move the objects between the two different applications. In this way, techniques of this disclosure may reduce the amount of time and the number of user inputs required to retrieve relevant objects from other applications, which may simplify the user experience and may reduce power consumption of the computing device.

In one example, the disclosure is directed to a method that includes receiving, by a first application executing at a computing device, information associated with a content page for a second application executing at the computing device. At least a first portion of the content page for the second application is included in a graphical user interface of the computing device. The method further includes determining, by the first application and based on the information associated with the content page for the second application, a context of the second application. The method further includes determining, by the first application and based at least in part on the context of the second application, a respective set of objects for each application from one or more applications related to the second application. The method further includes generating, by the first application and based at least in part on the respective sets of objects, a content page for the first application including one or more graphical indications of at least one object from at least one of the respective sets of objects. The method further includes, while at least a second portion of the content page for the second application is included in the graphical user interface, outputting, by the first application, for display, at least a portion of the content page for the first application within the graphical user interface of the computing device.

In another example, the disclosure is directed to a computing device that includes at least one processor and a memory that stores instructions associated with a first application. When executed, the instructions cause the at least one processor to receive information associated with a content page for a second application executing at the computing device. At least a first portion of the content page for the second application is included in a graphical user interface of the computing device. The instructions further cause the at least one processor to determine, based on the information associated with the content page for the second application, a context of the second application. The instructions further cause the at least one processor to determine, based at least in part on the context of the second application, a respective set of objects for each application from one or more applications related to the second application. The instructions further cause the at least one processor to generate, based at least in part on the respective sets of objects, a content page for the first application including one or more graphical indications of at least one object from at least one of the respective sets of objects. The instructions further cause the at least one processor to, while at least a second portion of the content page for the second application is included in the graphical user interface, output, for display, at least a portion of the content page for the first application within the graphical user interface of the computing device.

In another example, the disclosure is directed to a non-transitory computer-readable storage medium storing instructions that, when executed, cause at least one processor of a computing device to receive information associated with a content page for a second application executing at the computing device. At least a first portion of the content page for the second application is included in a graphical user interface of the computing device. The instructions further cause the at least one processor to determine, based on the information associated with the content page for the second application, a context of the second application. The instructions further cause the at least one processor to determine, based at least in part on the context of the second application, a respective set of objects for each application from one or more applications related to the second application. The instructions further cause the at least one processor to generate, based at least in part on the respective sets of objects, a content page for the first application including one or more graphical indications of at least one object from at least one of the respective sets of objects. The instructions further cause the at least one processor to, while at least a second portion of the content page for the second application is included in the graphical user interface, output, for display, at least a portion of the content page for the first application within the graphical user interface of the computing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
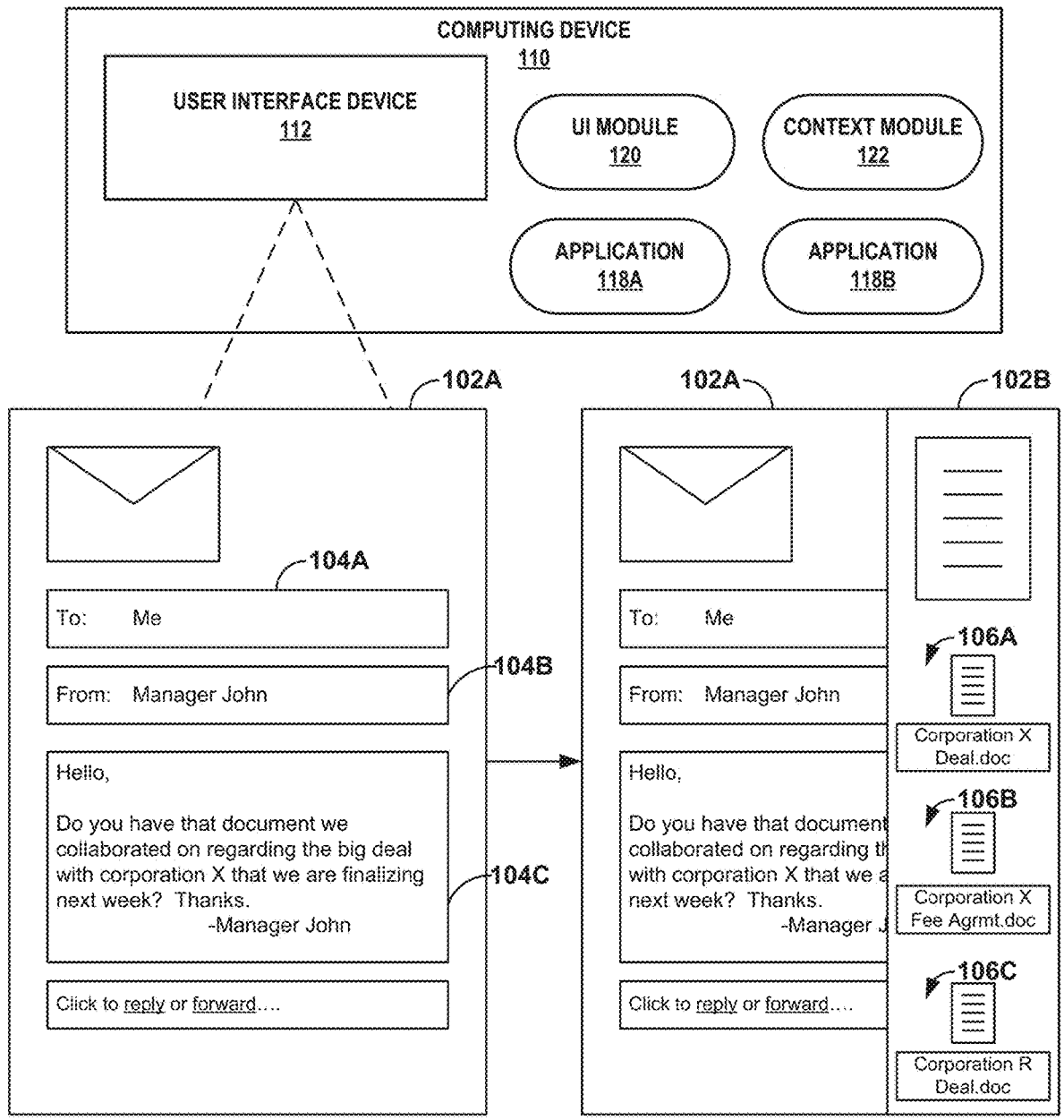
FIG. 1 is a conceptual diagram illustrating an example computing device configured to identify and display information determined to be relevant to a task being performed, in accordance with one or more aspects of the present disclosure.

FIG. 1 is a conceptual diagram illustrating an example computing device 110 configured to identify and display information determined to be relevant to a task being performed, in accordance with one or more aspects of the present disclosure. In the example of FIG. 1, computing device 110 represents an individual mobile or non-mobile computing device. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute a companion application (e.g., application 118B) or otherwise access applications related to a task that computing device 110 is currently performing.

Computing device 110 includes a user interface (UID) 112. UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or context module 122 processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface (e.g., user interface 102A or 102B) related to applications 118A and 118B and context module 122. UID 112 may present a user interface related to other features of computing platforms, operating systems, applications, and/or services executing at and/or accessible from computing device 110 (e.g., e-mail, chat, online services, telephone, gaming, etc.).

Computing device 110 further includes applications 118A and 118B, user interface (UI) module 120, and context module 122. Applications 118A and 118B and modules 120 and 122 may perform operations described using software, hardware, firmware, or a mixture of hardware, software, and firmware residing in and/or executing at computing device 110. One or more processors of computing device 110, or processors of multiple devices, may execute instructions that are stored at a memory or other non-transitory storage medium of computing device 110 to perform the operations of applications 118A and 118B and modules 120 and 122. Computing device 110 may execute applications 118A and 118B and modules 120 and 122 as virtual machines executing on underlying hardware. Applications 118A and 118B and modules 120 and 122 may execute as one or more services of an operating system or computing platform. Applications 118A and 118B and modules 120 and 122 may execute as one or more executable programs at an application layer of a computing platform.

UI module 120 manages user interactions with UID 112 and other components of computing device 110. In other words, UI module 120 may act as an intermediary between various components of computing device 110 to make determinations based on user input detected by UID 112 and generate output at UID 112 in response to the user input. UI module 120 may receive instructions from an application, service, platform, or other module of computing device 110 to cause UID 112 to output a user interface (e.g., user interface 14A). UI module 120 may manage inputs received by computing device 110 as a user views and interacts with the user interface presented at UID 112 and update the user interface in response to receiving additional instructions from the application, service, platform, or other module of computing device 110 that is processing the user input.

As shown in FIG. 1, user interface 102A is an email user interface. However, user interface 102A may be any graphical user interface produced during the execution of a first application, such as application 118A. In the example of FIG. 1, user interface 102A includes content object 104A (i.e., the "to" field of the email correspondence), content object 104B (i.e., the "from" field of the email correspondence), and content object 104C (i.e., the body of the email correspondence).

In accordance with the techniques of this disclosure, UI module 120 may execute application 118A generate a content page for application 118A, which is currently executing on computing device 110. In the example for FIG. 1, application 118A is an email application that is part of a web suite of applications. The content page for the email application may include a "To" field, a "From" field, a subject line, an email body area, a listing of emails, additional content in the chain of emails, or any additional content related to a user's email inbox or outbox, including text, images, metadata, an application state, application code, field identifiers, file names, or file types.

UI module 120 may output, for display via UID 112, graphical user interface 102A that includes at least a portion of the content page for application 118A. In the example of FIG. 1, the portion of the content page included in graphical user interface 102A consists of content object 104A (i.e., the "to" field of the email correspondence), content object 104B (i.e., the "from" field of the email correspondence), and content object 104C (i.e., the body of the email correspondence). However, in other examples, UI module 120 may output more content objects or less content objects based on the graphical real estate available in UID 112 and the amount of content contained within each content object.

After receiving explicit permission from the user to do so, context module 122 may execute application 118B to receive information associated with the content page for application 118A. Context module 122 may then execute application 118B to determine, based on the content page for application 118A, a context of application 118A for application 118B. The context may include any information regarding a current state of application 118A that may provide an indication of a current task being performed within application 118A, a future task to be performed within application 118A, or any other information relevant to application 118A. For instance, prior to executing application 118B, UI module 120 may output a request for explicit user permission to execute application 118B and transfer the information associated with the content page for 118A. After receiving the explicit permission to do so, context module 122 may begin executing application 118B. If explicit permission is denied, context module 122 may instead refrain from executing application 118B.

In the example of FIG. 1, context module 122 may determine that content object 104A indicates that the current email correspondence is a received email addressed to the user of computing device 110. Context module 122 may further determine that content object 104B indicates that the user's boss, "Manager John", is the author of the current email correspondence and that the email is, therefore, likely work related. Finally, context module 122 may further determine that content object 104C indicates that the user's boss is requesting a document authored by both the user and the boss regarding a deal with corporation X.

While the example of FIG. 1 describes context module 122 using content objects that UI module 120 is currently outputting for display via UID 112, context module 122 may analyze any content objects within the content page in the context determination process, including content objects that UI module 120 is not currently outputting for display but are on the same content page. For instance, content object 104C may be a reply to a previous email chain, which is included on the content page but off-screen. Context module 122 may use the previous email chain as additional data when determining the context of application 118A.

Based at least in part on the context of application 118A, context module 122 may execute application 118B to determine a respective set of objects for each application from one or more applications related to application 118A. For instance, application 118A, the email application, may be a part of a web suite of applications. Application 118B may be configured to access data from other applications within the same web suite, which would be related to application 118A. In other instances, any application that may exchange data with application 118A may be considered a related application. In still other instances, any application developed by a same company as application 118A may be considered a related application. In still other instances, any application that may interact with same contents of a data storage device as application 118A may be considered a related application.

In the example of FIG. 1, application 118B determined the context of application 118A to be that the user is reviewing an email exchange with the user's boss in order to find a specific document that the user and the user's boss collaborated on drafting. Context module 122 may then execute application 118B to search for documents within a document editing/storage application related to application 118A based on the determined context (e.g., a document regarding corporation X and a deal that is occurring with said corporation X). Application 118B may retrieve a list of documents associated with the related document editing/storage application that include references to corporation X, deals that the user's business is a party to, documents that are co-authored by the user and the user's boss, etc.

Application 118B may forward the list of retrieved objects to UI module 120, which may generate a content page for application 118B that includes one or more graphical indications of at least one object from at least one of the respective sets of objects. The content page may include a portion of or the entirety of the set of objects retrieved by application 118B. UI module 120 may then output, for display at UID 112, graphical user interface 102B that includes at least a portion of the content page for application 118B while at least a portion of graphical user interface 102A is displayed.

For instance, application 118B may retrieve a set of ten documents that are related to either corporation X, a deal that the user is a party to, or that are co-authored by the user and the user's boss. Application 118B may sort the documents based on how closely the documents match the determined context. In the example of FIG. 1, document 106A, titled "Corporation X Deal.doc," may be a document co-authored by the user and the user's boss regarding a deal between the user's company and corporation X. Document 106B, titled "Corporation X Fee Agreement.doc," may be a document co-authored by the user and the user's boss regarding a previous fee agreement between the user's company and corporation X. Document 106C, titled "Corporation R Deal.doc," may be a document authored by the user regarding a deal between the user's company and corporation R. UI module 120 may determine that UID 112 is large enough to display three of the ten documents. UI module 120 may output graphical user interface 102B as showing the top three documents, or the three documents ranked highest in the ranked list that application 118B previously generated (i.e., documents 106A-106C), of the ten total retrieved documents. Graphical user interface 102B may be scrollable such that each of the other seven documents not initially shown in graphical user interface 102B may be displayed to the user.

By utilizing application 118B to determine contextual information of application 118A executing on computing device 110, computing device 110 may provide a way for a user to quickly obtain documents, files, or any other stored data object determined to be relevant to the task being performed by application 118A on computing device 110 without requiring the user to switch between several different applications, manually navigate to relevant content pages within the respective applications, or discern what input is necessary to move the objects between the two different applications. For instance, in the example of FIG. 1, the user may drag document 106A, the likely document requested by the user's boss, into the reply field of application 118A's graphical user interface to attach the requested document to a reply email. In this way, techniques of this disclosure may reduce the amount of time and the number of user inputs required to retrieve relevant objects in other applications, which may simplify the user experience and may reduce power consumption of computing device 110.

By providing contextual information associated with application 118A to application 118B, techniques of this disclosure may provide a way for a user to quickly obtain documents, files, or any other data determined to be relevant to the task being performed using application 118A without requiring the user to switch between several different applications, manually navigate to relevant content pages within the respective applications, or discern what input is necessary to move the objects between the two different applications. In this way, techniques of this disclosure may reduce the amount of time and the number of user inputs required to retrieve relevant objects from other applications, which may simplify the user experience and may reduce power consumption of computing device 110.

Figure 2:
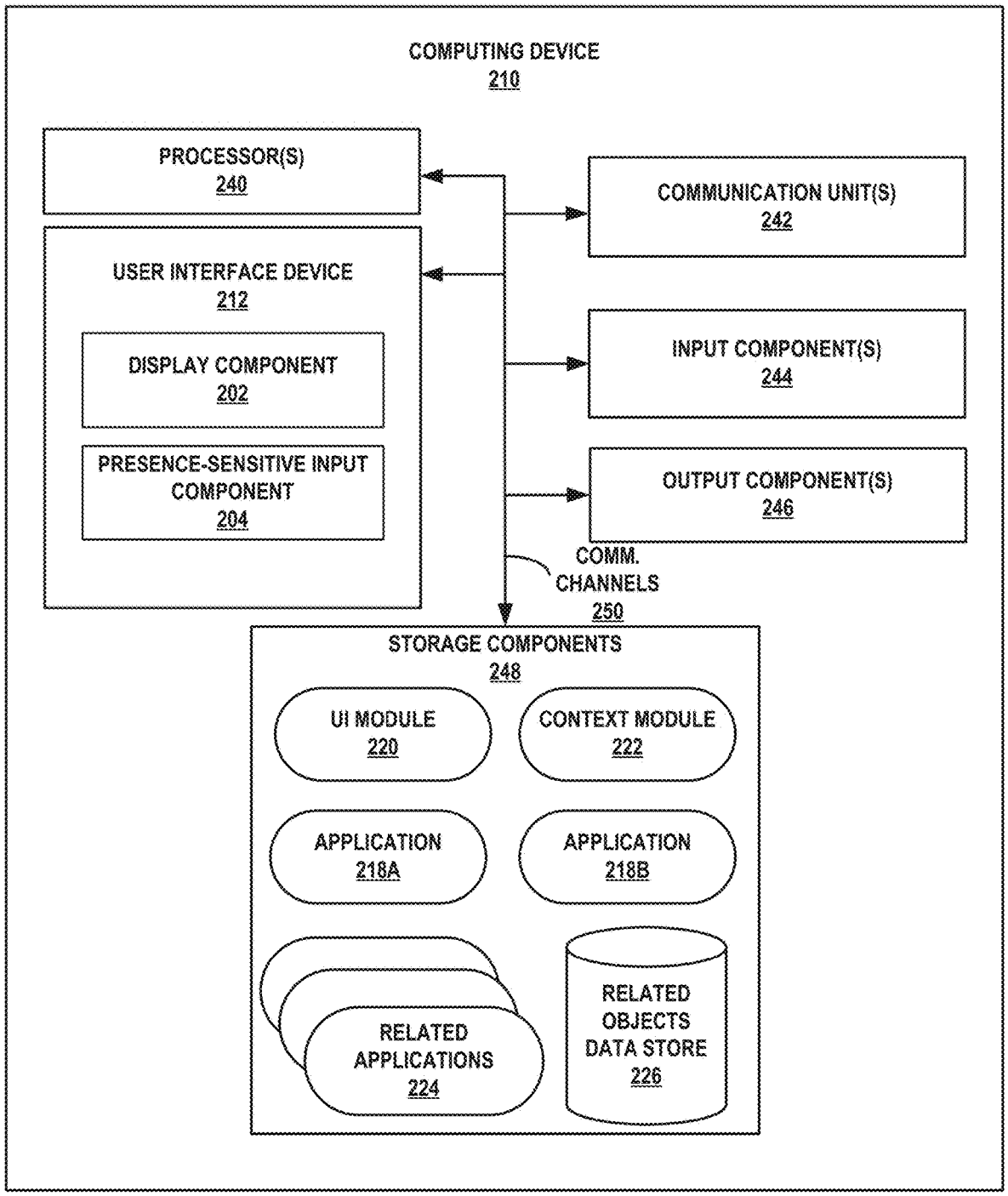
FIG. 2 is a block diagram illustrating an example computing device configured to identify and display information determined to be relevant to a task being performed, in accordance with one or more aspects of the present disclosure.

FIG. 2 is a block diagram illustrating an example computing device configured to identify and display information determined to be relevant to a task being performed, in accordance with one or more aspects of the present disclosure. Computing device 210 of FIG. 2 is described below as an example of computing device 110A and/or 110B of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202 and presence-sensitive input component 204. Storage components 248 of computing device 210 include application 218A, application 218B, UI module 220, context module 222, one or more related applications 224, and related objects data store 226.

One or more processors 240 may implement functionality and/or execute instructions associated with computing device 210 to proactively guide the user to information that is related to a task being performed on computing device 210 on application 218A. Examples of processors 240 include application processors, display controllers, auxiliary processors, one or more sensor hubs, and any other hardware configure to function as a processor, a processing unit, or a processing device. Modules 218A, 218B, 220, and 222 may be operable by processors 240 to perform various actions, operations, or functions of computing device 210. For example, processors 240 of computing device 210 may retrieve and execute instructions stored by storage components 248 that cause processors 240 to perform the operations modules 218A, 218B, 220, and 222. The instructions, when executed by processors 240, may cause computing device 210 to provide information about application 218A to application 218B, which determines a context of application 218A and retrieves related objects based on the context.

UI module 220 may include all functionality of UI module 120 of computing device 110 of FIG. 1 and may perform similar operations as UI module 120 for managing a user interface (e.g., user interfaces 102A and 102B) that computing device 210 provides at UID 212 for example, for facilitating interactions between a user of computing device 110 and applications 218A and 218B. For example, UI module 220 of computing device 210 may receive information from applications 218A and 218B that includes instructions for outputting (e.g., displaying) a companion user interface (e.g., user interface 102B). UI module 220 may receive the information from application 218B over communication channels 250 and use the data to generate a user interface. UI module 220 may transmit a display command and associated data over communication channels 250 to cause UID 212 to present the user interface at UID 212.

Context module 222 may include all functionality of context module 122 of computing device 110 of FIG. 1 and may perform similar operations as context module 122 for executing application 218B. In some examples, context module 222 may execute locally (e.g., at processors 240) to provide functions associated with retrieving objects related to a current context of application 218A. In some examples, context module 222 may act as an interface to a remote companion service accessible to computing device 210. For example, context module 222 may be an interface or application programming interface (API) to a remote version of application 218B.

One or more related applications 224 represent all the various individual applications and services executing at and accessible from computing device 210 that may be accessed by application 218B and context module 222 to provide the user with information and/or perform a task. Numerous examples of related applications 224 may exist and include an e-mail application, a chat or messaging application, a calendar application, a document processing application, an contact storage application, a search application, a map or navigation application, a transportation service application (e.g., a bus or train tracking application), a social media application, an Internet browser application, or any and all other applications that may execute at computing device 210. In general, one or more related applications 224 may include any application in a same suite as application 218A, any application that may exchange data with application 218A, any application developed by a same company as application 218A, or any application that may interact with same contents of a data storage device as application 218A.

As used throughout the disclosure, the term "context" is used to describe any information that can be used by context module 222 and application 218B to define a task or details regarding a task that a computing device, and the user of the computing device, may be performing at a particular time using application 218A. For instance, after receiving explicit permission from the user, application 218B may receive information about a current state or a current task being performed using application 218A and determine the context based on said information. In general, application 218B may determine the context based on information in a content page of application 218A, at least a portion of which may be output for display in a graphical user interface. The content page may include various content objects or content data structures, each of which may include text, images, media, audio, metadata, computer code, or uniform resource locator (URL) information that application 218B may analyze to determine the context of application 218A.

One or more storage components 248 within computing device 210 may store information for processing during operation of computing device 210 (e.g., computing device 210 may store data accessed by modules 218A, 218B, 220, and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 218A, 218B, 220, and 222 and data store 226. Storage components 248 may include a memory configured to store data or other information associated with modules 218A, 218B, 220, and 222 and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine in a selected modality.

UID 212 of computing device 210 may be similar to UID 112 of computing device 110A and includes display component 202 and presence-sensitive input component 204. Display component 202 may be a screen at which information (e.g., a visual indication) is displayed by UID 212 while presence-sensitive input component 204 may detect an object at and/or near display component 202.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

In accordance with the techniques of this disclosure, UI module 220 may execute application 218A generate a content page for application 218A, which is currently executing on computing device 210. In the example for FIG. 2, application 218A may be a chat application. The content page for the chat application may include a contact field, a user identification field, a prior chat history, current chat conversation, a text entry field, conversation windows with other users, additional contact information for a counterpart in the chat application, or any additional content related to a user's chat conversations, including text, images, metadata, an application state, application code, field identifiers, file names, or file types.

UI module 220 may output, for display via UID 212, a graphical user interface that includes at least a portion of the content page for application 218A. In the example of FIG. 2, the portion of the content page included in the graphical user interface could include a current chat conversation, a current chat partner, and a communication entry field for the user to enter text or attach media or other files to the chat conversation. However, in other examples, UI module may output more content objects or less content objects based on the graphical real estate available in UID 212 and the amount of content contained within each content object.

Context module 222 may execute application 218B to receive information associated with the content page for application 218A. For instance, application 218B may receive a chat history between the user and the current chat partner, any information in the communication entry field, any information regarding the current chat conversation, and other chat partners that the user is currently conversing with. Part of the current chat conversation may include a discussion of weekend plans with the chat partner. In some examples, context module 222 may begin executing application 218B to determine the context responsive to receiving an indication of user input to begin executing application 218B.

Context module 222 may then execute application 218B to determine, based on the content page for application 218A, a context of application 218A for application 218B. The context may include any information regarding a current state of application 218A that may provide an indication of a current task being performed within application 218A, a future task to be performed within application 218A, or any other information relevant to application 218A. In the example of FIG. 2, context module 222 may determine that the user is discussing weekend plans with the current chat partner. Context module 222 may further determine that the current chat conversation includes a discussion of food that both the user and the chat partner enjoy, even if this portion of the current chat conversation is not currently being displayed on UID 212. Finally, context module 222 may further determine that a chat history between the users include an activity venue that both the user and the chat partner were interested in visiting, even if this portion of the chat history is not currently being displayed on UID 212.

In determining the context, application 218B may identify one or more content objects in the content page for the second application. The content objects may include one or more of text, images, metadata, an application state, application code, field identifiers, file names, or file types. From these content objects, application 218B may extract at least one respective property of each of the one or more content objects. Application 218B may determine the context based at least in part on one or more properties of the at least one respective property of each of the one or more content objects. For instance, Application 218B may extract the text from the current conversation window. Application 218B may parse the text of the current conversation to determine a topic of the conversation or a particular subject of the conversation. In the current instance, the current chat conversation includes a discussion of weekend plans with the chat partner. As such, application 218B parse the text to determine that the user may be attempting to make plans with the chat partner, and that retrieving objects related to the user's calendar may be helpful for the current conversation.

Similarly, if the user had been exchanging media files (e.g., images, audio, or video) or other documents with the current chat partner, application 218B may analyze the exchanged files, such as using image recognition, filename analysis, audio parsing, or any other analysis to determine the contents of the exchanged files. Application 218B may determine the context based on the additional results of this analysis.

Based at least in part on the context of application 218A, context module 222 may execute application 218B to determine a respective set of objects for each application from related applications 224 to application 218A. For instance, application 218A, the chat application, may be a part of a web suite of applications. Application 218B may be configured to access data from related applications 224, which may be other applications within the same web suite, which would be related to application 218A. In other instances, related applications 224 may include any application that may exchange data with application 218A. In still other instances, related applications 224 may include any application developed by a same company as application 218A. In still other instances, related applications 224 may include any application that may interact with same contents of a data storage device as application 218A.

In retrieving the respective sets of objects, application 218B may construct a respective search query for each of the one or more applications 224 related to application 218A based on the context. Application 218B may then execute each respective search query from the respective search queries to retrieve the respective set of objects from related objects data store 226 of a corresponding application from the one or more applications 224 related to application 218A. In such instances, related objects data store 226 includes the respective sets of objects. For example, the calendar application of related applications 224 may utilize related objects data store 226 to store the instances of calendar events. Based on the context of the user discussing weekend plans, application 218B may construct a search query for events that happen between 5 PM Friday night and 11 PM Sunday night. Application 218B may execute this search query within related objects data store 226 and retrieve the results of the search query from related objects data store 226, the results being the respective set of objects for the calendar application.

In some examples, application 218B may retrieve objects associated with each of multiple related applications 224 and output a conglomeration of the objects from different applications. For instance, in addition to the general weekend plans, application 218B determined that the context included a discussion of a type of restaurant that both the user and the chat partner enjoy (e.g., Italian restaurants). In addition to retrieving the calendar events, application 218B may also execute a search application to search for Italian restaurants in the vicinity of the user. In such instances, in constructing the content page for application 218B, application 218B may include both graphical indications of the two calendar events and a graphical indication of the highest rated Italian restaurant in the area, combining the results of two different related applications into the same graphical user interface.

In the example of FIG. 2, application 218B determined the context of application 218A to be that the user is discussing weekend plans with the chat partner. Context module 222 may then execute application 218B to search a calendar application in related applications 224 for any calendar events during this weekend based on the determined context (i.e., that the user and the chat partner are discussing weekend plans). Application 218B may retrieve a list of calendar events for the user stored in the related calendar application that take place during the discussed time.

Application 218B may forward the list of retrieved objects to UI module 220, which may generate a content page for application 218B that includes one or more graphical indications of at least one object from at least one of the respective sets of objects. The content page may include a portion of or the entirety of the set of objects retrieved by application 218B. UI module 220 may then output, for display at UID 212, graphical user interface 202B that includes at least a portion of the content page for application 218B while at least a portion of the original graphical user interface is displayed. In some instances, the content page for application 218B may be displayed in a way that the content page for application 218B overlaps or replaces a portion of the displayed graphical user interface for application 218A. In other instances, the content page for application 218B may be displayed in a way that the original graphical user interface is shrunk and displayed side-by-side with the content page for application 218B without increasing or decreasing the size of the frame containing the combined graphical user interface.

For instance, application 218B may retrieve each calendar event in the user's calendar for the timeframe of the upcoming weekend (e.g., a concert on Friday night and a brunch with the user's parents on Saturday morning). UI module 220 may determine that UID 212 is large enough to display both of the calendar events. UI module 220 may output an additional graphical user interface showing the two calendar events.

In some instances, after outputting the graphical indications of the related objects, application 218B may receive an indication of user input selecting a first graphical indication of a first object from the one or more graphical indications of the at least one object included in the content page for the first application. Context module 222 may then send instructions to application 218A to perform a function utilizing the first object within application 218A. For instance, application 218B may receive an indication of user input selecting the calendar event for the user's brunch with the user's parents Saturday morning. Upon receiving the selection, context module 222 may insert a graphical card into the chat conversation with the chat partner and send the graphical card to the chat partner, the graphical card including the date, time, and location information for the user's brunch calendar event.

In some examples, the user may select which content objects that application 218B should analyze in order to determine the context. For instance, application 218B may receive an indication of a selection of one or more graphical indications representing one or more content objects included in the content page of application 218A. Application 218B may then determine an updated context of application 218A based on the selected one or more content objects. Application 218B may determine a respective updated set of objects for each of related applications 224 based at least in part on the updated context and generate an updated content page for the second application including one or more graphical indications of at least one object from at least one of the respective updated sets of objects. UI module 218 may then output, for display, a portion of the updated content page for application 218B within the graphical user interface. For instance, application 218B may receive an indication of user input selecting the portion of the conversation explicitly mentioning the common affinity for a particular type of restaurant. Application 218B may, accordingly, determine the context of the conversation to be centered around the type of restaurant rather than plans specifically for the weekend. The retrieved content objects may reflect the updated context.

In some examples, the content page for application 218B may only include results from a single related application. However, the user may wish to see results from a different related application. As such, application 218B may receive an indication of user input selecting a different related application from related applications 224. Application 218B may generate, based at least in part on the respective sets of objects, an updated content page for application 218B including one or more graphical indications of at least one object from a second set of objects for the different application from related applications 224 and output, for display, a portion of the updated content page for application 218B within the graphical user interface. For instance, the user may wish to send contact information of a person attending the concert with the user on Friday night. As such, rather than the calendar application, the user may wish to access their address book application. Application 218B may receive an indication of user input selecting the address book application and output a new set of objects based on the previously determined context.

Figure 3A:
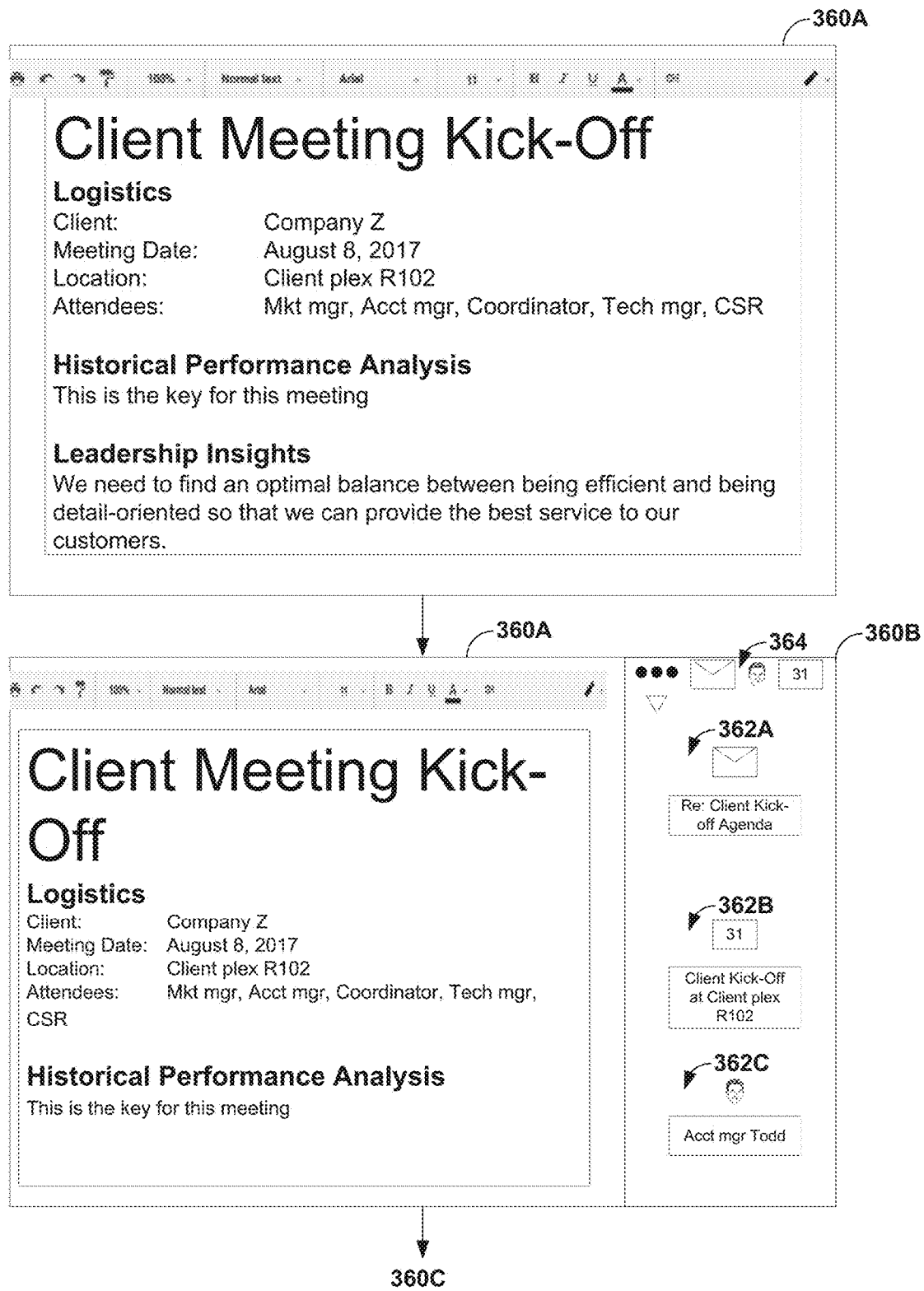
FIGS. 3A-3C are conceptual diagrams illustrating a sequence of operations for an example computing device configured to identify and display information determined to be relevant to a task being performed, in accordance with one or more aspects of the present disclosure.
Figure 3B:
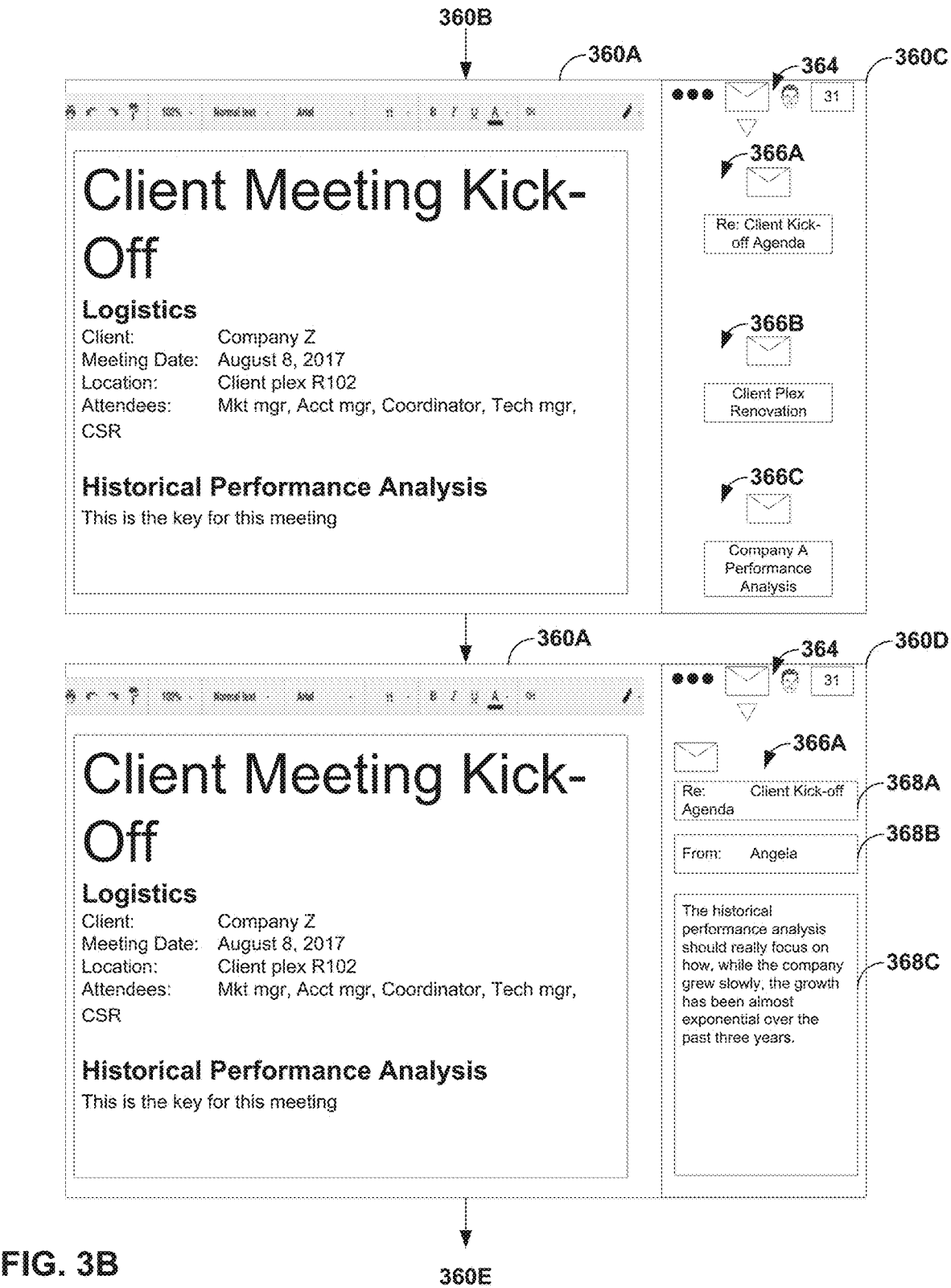
Figure 3C:
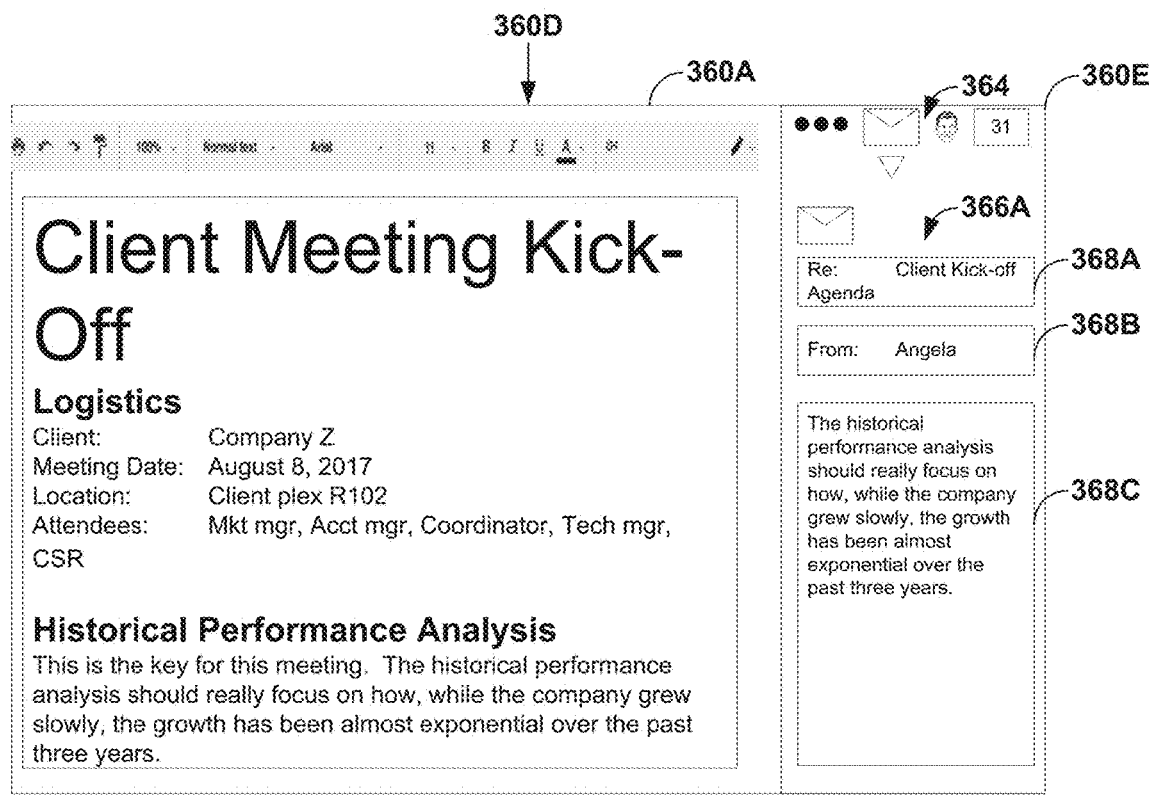
Figure 4:
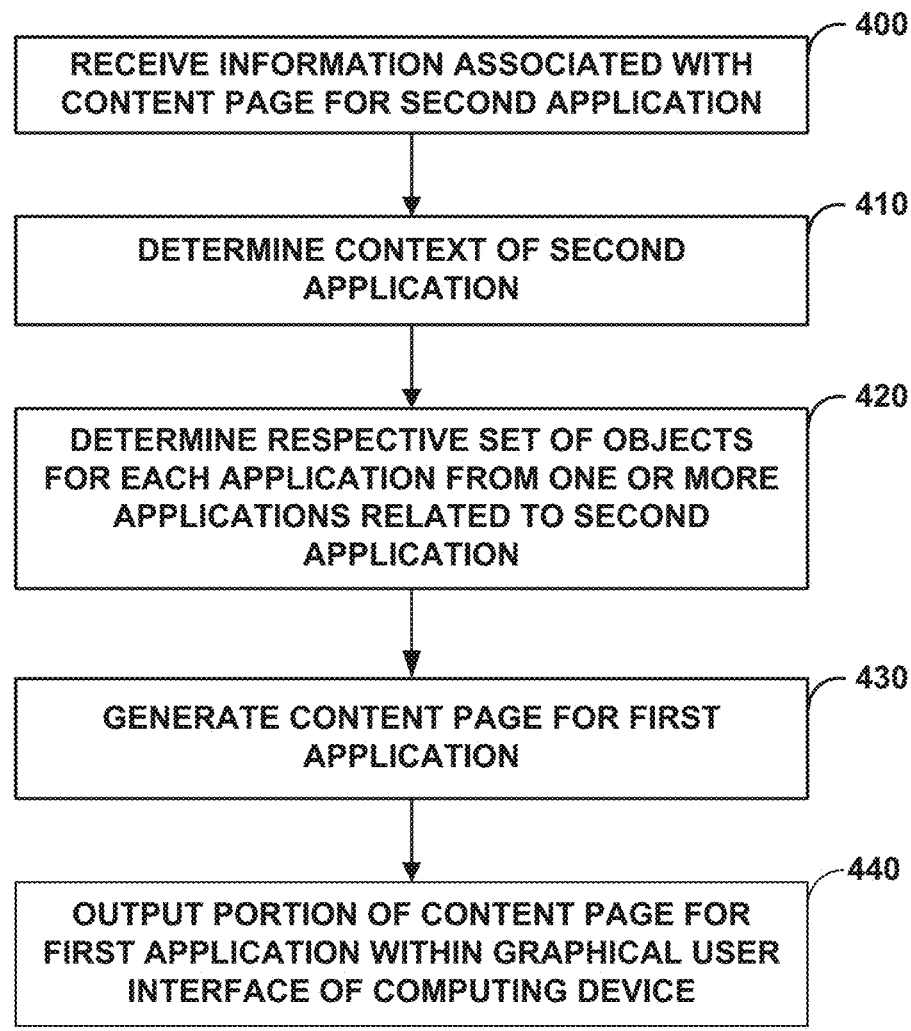
FIG. 4 is a flowchart illustrating further example operations of an example computing device configured to identify and display information determined to be relevant to a task being performed, in accordance with one or more aspects of the present disclosure.

FIGS. 3A-3C are conceptual diagrams illustrating a sequence of operations for an example computing device configured to execute a companion application to identify and display information from various applications that may be relevant to a task being performed using a currently executing application, in accordance with one or more aspects of the present disclosure. FIG. 3 is described below in the context of computing device 110 of FIG. 1. For example, context module 122, while executing at one or more processors of computing device 110, may execute application 118B to produce graphical user interfaces 360A-360E, in accordance with one or more aspects of the present disclosure. For purposes of illustration only, FIG. 4 is described below within the context of computing device 110 of FIG. 1.

In FIG. 3A, computing device 110 may execute application 118A to produce graphical user interface 260A. In the example of FIGS. 3A-3C, application 118A may be a word processing application. Graphical user interface 360A shows that the user may be editing text document about a client meeting for Company Z on Aug. 8, 2017. Further details of the meeting, including an agenda, are included in graphical user interface 360A. A content page for application 118A may be the entire text document, even though graphical user interface 360A may only include a portion of the text document.

At some point, computing device 110 may begin executing application 118B. Application 118B may determine a context of application 118A based on the content page (i.e., the entirety of the text document). Application 118B may extract information about the text document, including any additional authors of the text document and the content of the text document. Based on this context, application 118B may retrieve respective sets of objects from applications related to application 118A. In the example of FIG. 3A, application 118B may retrieve objects from an email application, a calendar application, and a contact book application, each of which is related to application 118A. A list of these applications, including a combined page that includes objects related to all of the applications, may be depicted by graphical element 364.

In the example of FIG. 3A, application 118B may determine that the title of the text document is "Client Meeting Kick-Off." Application 118B may also determine that the related email application includes an email from a co-author of the text document with the subject line "Re: Client Kick-off Agenda." Application 118B may determine that this email may include information that is useful to the user given the current context and output graphical indication 362A of the email message.

Application 118B may also find a calendar event for the meeting discussed in the word document in the calendar application, as well as contact information for one of the attendees of the meeting. As such, application 118B may also output graphical indications 362B and 362C, respectively, of these objects in graphical user interface 360B.

In FIG. 3B and graphical user interface 360C, the user may select the email application from the list of graphical indications 364, as the user may be looking for a particular email discussing the text document. As such, application 118B may generate an updated content page that only includes emails retrieved from a data store for the email application. Graphical indication 366A may be the same email message as originally shown in graphical user interface 360B. However, graphical user interface 360C may also include two additional graphical indications 366B and 366C associated with additional emails not initially displayed in graphical user interface 360B.

Application 118B may then receive an indication of user input selecting graphical indication 366A and the associated email. As such, application 118B may access the related email application to update the graphical user interface to show additional information regarding the selected email message. For instance, application 118B may output, for display in graphical user interface 360D, subject line 368A, contact line 368B, and email body 368C.

In FIG. 3C, application 118B may receive an indication of further user input selecting email body 368C. As such, in graphical user interface 360E, application 118B may perform a function in application 118A using the selected email body 368C. In the example of FIG. 3C, the function correlates to a "copy and paste" function, pasting the body of the email into the text document. In this way, the user is able to quickly navigate between multiple applications that may communicate with one another and transfer relevant information between said applications without ever fully navigating away from the initial application.

FIG. 4 is a flowchart illustrating further example operations of an example computing device configured to execute a companion application to identify and display information from various applications that may be relevant to a task being performed using a currently executing application, in accordance with one or more aspects of the present disclosure. FIG. 4 is described below in the context of computing device 110 of FIG. 1. For example, context module 122, while executing at one or more processors of computing device 110, may execute application 118B to perform operations 400-440, in accordance with one or more aspects of the present disclosure. For purposes of illustration only, FIG. 4 is described below within the context of computing device 110 of FIG. 1.

In accordance with the techniques of this disclosure, context module 112 may execute application 118B to receive information associated with a content page for application 118A executing at computing device 110 (400). Context module 122 may then execute application 118B to determine, based on the content page for application 118A, a context of application 118A for application 118B (410). The context may include any information regarding a current state of application 118A that may provide an indication of a current task being performed within application 118A, a future task to be performed within application 118A, or any other information relevant to application 118A.

While the example of FIG. 1 describes context module 122 using content objects that UI module 120 is currently outputting for display via UID 112, context module 122 may analyze any content objects within the content page in the context determination process, including content objects that UI module 120 is not currently outputting for display but are on the same content page. For instance, content object 104C may be a reply to a previous email chain, which is included on the content page but off-screen. Context module 122 may use the previous email chain as additional data when determining the context of application 118A.

Based at least in part on the context of application 118A, context module 122 may execute application 118B to determine a respective set of objects for each application from one or more applications related to application 118A (420). For instance, application 118A, the email application, may be a part of a web suite of applications. Application 118B may be configured to access data from other applications within the same web suite, which would be related to application 118A. In other instances, any application that may exchange data with application 118A may be considered a related application. In still other instances, any application developed by a same company as application 118A may be considered a related application. In still other instances, any application that may interact with same contents of a data storage device as application 118A may be considered a related application.

Application 118B may forward the list of retrieved objects to UI module 120, which may generate a content page for application 118B that includes one or more graphical indications of at least one object from at least one of the respective sets of objects (430). The content page may include a portion of or the entirety of the set of objects retrieved by application 118B. UI module 120 may then output, for display at UID 112, graphical user interface 102B that includes at least a portion of the content page for application 118B while at least a portion of graphical user interface 102A is displayed (440).

By utilizing application 118B to determine contextual information of application 118A executing on computing device 110, computing device 110 may provide a way for a user to quickly obtain documents, files, or any other stored data object determined to be relevant to the task being performed by application 118A on computing device 110 without requiring the user to switch between several different applications, manually navigate to relevant content pages within the respective applications, or discern what input is necessary to move the objects between the two different applications. For instance, in the example of FIG. 1, the user may drag document 106A, the likely document requested by the user's boss, into the reply field of application 118A's graphical user interface to attach the requested document to a reply email. In this way, techniques of this disclosure may reduce the amount of time and the number of user inputs required to retrieve relevant objects in other applications, which may simplify the user experience and may reduce power consumption of computing device 110.

Clause 1. A method comprising: receiving, by a first application executing at a computing device, information associated with a content page for a second application executing at the computing device, wherein at least a first portion of the content page for the second application is included in a graphical user interface of the computing device; determining, by the first application and based on the information associated with the content page for the second application, a context of the second application; determining, by the first application and based at least in part on the context of the second application, a respective set of objects for each application from one or more applications related to the second application; generating, by the first application and based at least in part on the respective sets of objects, a content page for the first application including one or more graphical indications of at least one object from at least one of the respective sets of objects; and while at least a second portion of the content page for the second application is included in the graphical user interface, outputting, by the first application, for display, at least a portion of the content page for the first application within the graphical user interface of the computing device.

Clause 2. The method of clause 1, wherein determining the context of the second application comprises: identifying, by the first application, one or more content objects in the content page for the second application; extracting, by the first application, at least one respective property of each of the one or more content objects; and determining, by the first application and based at least in part on one or more properties of the at least one respective property of each of the one or more content objects, the context of the second application.

Clause 3. The method of clause 2, wherein the one or more content objects include one or more of text, images, metadata, an application state, application code, field identifiers, file names, or file types.

Clause 4. The method of any one of clauses 1-3, wherein determining the respective set of objects for each application from the one or more applications related to the second application comprises: constructing, by the first application and based on the context, a respective search query for each of the one or more applications related to the second application; and executing, by the first application, each respective search query from the respective search queries to retrieve the respective set of objects from data of a corresponding application from the one or more applications related to the second application.

Clause 5. The method of any one of clauses 1-4, wherein the one or more applications related to the second application comprises at least two applications related to the second application, and wherein generating the content page for the first application comprises generating, by the first application and based at least in part on the respective sets of objects for the at least two applications related to the second application, the content page for the first application including at least one graphical indication of at least one object from the respective sets of objects for each application from the at least two applications related to the second application.

Clause 6. The method of any one of clauses 1-5, further comprising: receiving, by the first application, an indication of user input selecting a first graphical indication of a first object from the one or more graphical indications of the at least one object included in the content page for the first application; and sending, by the first application, instructions to the second application to perform a function utilizing the first object.

Clause 7. The method of any one of clauses 1-6, further comprising: receiving, by the first application, an indication of a selection of one or more graphical indications representing one or more content objects included in the content page of the second application; determining, by the first application and based on the one or more content objects, an updated context of the second application; determining, by the first application and based at least in part on the updated context of the second application, a respective updated set of objects for each application from the one or more applications related to the second application; generating, by the first application and based at least in part on the respective updated sets of objects, an updated content page for the second application including one or more graphical indications of at least one object from at least one of the respective updated sets of objects; and while at least a third portion of the content page for the second application is included in the graphical user interface, outputting, by the first application, for display, a portion of the updated content page for the first application within the graphical user interface of the computing device.

Clause 8. The method of any one of clauses 1-7, wherein outputting the portion of the content page for the first application comprises: while at least the second portion of the content page for the second application is included in the graphical user interface, replacing, by the first application, a portion of the graphical user interface with the portion of the content page for the first application.

Clause 9. The method of any one of clauses 1-8, wherein the portion of the content page for the first application that is output for display includes one or more graphical indications of at least one object from a first set of objects for an application from the one or more applications related to the second application, the method further comprising: receiving, by the first application, an indication of user input selecting a different application from the one or more applications related to the second application; generating, by the first application, based at least in part on the respective sets of objects, an updated content page for the first application including one or more graphical indications of at least one object from a second set of objects for the different application from the one or more applications related to the second application; and while at least the second portion of the content page for the second application is included in the graphical user interface, outputting, by the first application, for display, a portion of the updated content page for the first application within the graphical user interface of the computing device.

Clause 10. The method of any one of clauses 1-9, further comprising: prior to determining the context, receiving, by the computing device, an indication of user input to begin executing the first application; and responsive to receiving the indication of user input, determining, by the first application, the context.

Clause 11. A computing device comprising: at least one processor; and a memory that stores instructions associated with a first application that, when executed, cause the at least one processor to: receive information associated with a content page for a second application executing at the computing device, wherein at least a first portion of the content page for the second application is included in a graphical user interface of the computing device; determine, based on the information associated with the content page for the second application, a context of the second application; determine, based at least in part on the context of the second application, a respective set of objects for each application from one or more applications related to the second application; generate, based at least in part on the respective sets of objects, a content page for the first application including one or more graphical indications of at least one object from at least one of the respective sets of objects; and while at least a second portion of the content page for the second application is included in the graphical user interface, output, for display, at least a portion of the content page for the first application within the graphical user interface of the computing device.

Clause 12. The computing device of clause 14, wherein the instructions that cause the at least one processor to determine the context of the second application comprise instructions associated with the first application that, when executed, cause the at least one processor to: identify one or more content objects in the content page for the second application, wherein the one or more content objects include one or more of text, images, metadata, an application state, application code, field identifiers, file names, or file types; extract at least one respective property of each of the one or more content objects; and determine, based at least in part on one or more properties of the at least one respective property of each of the one or more content objects, the context of the second application.

Clause 13. The computing device of any one of clauses 14-15, wherein the instructions that cause the at least one processor to determine the respective set of objects for each application from the one or more applications related to the second application comprise instructions associated with the first application that, when executed, cause the at least one processor to: construct, based on the context, a respective search query for each of the one or more applications related to the second application; execute each respective search query from the respective search queries to retrieve the respective set of objects from data of a corresponding application from the one or more applications related to the second application.

Clause 14. The computing device of any one of clauses 14-16, wherein the one or more applications related to the second application comprises at least two applications related to the second application, and wherein the instructions that cause the at least one processor to generate the content page for the first application comprise instructions associated with the first application that, when executed, cause the at least one processor to generate, based at least in part on the respective sets of objects for the at least two applications related to the second application, the content page for the first application including at least one graphical indication of at least one object from the respective sets of objects for each application from the at least two applications related to the second application.

Clause 15. The computing device of any one of clauses 14-17, wherein the instructions associated with the first application, when executed, further cause the at least one processor to: receive an indication of user input selecting a first graphical indication of a first object from the one or more graphical indications of the at least one object included in the content page for the first application; and send instructions to the second application to perform a function utilizing the first object.

Clause 16. A non-transitory computer-readable storage medium storing instructions associated with a first application that, when executed, cause at least one processor of a computing device to: receive information associated with a content page for a second application executing at the computing device, wherein at least a first portion of the content page for the second application is included in a graphical user interface of the computing device; determine, based on the information associated with the content page for the second application, a context of the second application; determine, based at least in part on the context of the second application, a respective set of objects for each application from one or more applications related to the second application; generate, based at least in part on the respective sets of objects, a content page for the first application including one or more graphical indications of at least one object from at least one of the respective sets of objects; and while at least a second portion of the content page for the second application is included in the graphical user interface, output, for display, at least a portion of the content page for the first application within the graphical user interface of the computing device.

Clause 17. The non-transitory computer-readable storage medium of clause 16, wherein the instructions that cause the at least one processor to determine the context of the second application comprise instructions associated with the first application that, when executed, cause the at least one processor to: identify one or more content objects in the content page for the second application, wherein the one or more content objects include one or more of text, images, metadata, an application state, application code, field identifiers, file names, or file types; extract at least one respective property of each of the one or more content objects; and determine, based at least in part on one or more properties of the at least one respective property of each of the one or more content objects, the context of the second application.

Clause 18. The non-transitory computer-readable storage medium of any one of clauses 16-17, wherein the instructions that cause the at least one processor to determine the respective set of objects for each application from the one or more applications related to the second application comprise instructions associated with the first application that, when executed, cause the at least one processor to: construct, based on the context, a respective search query for each of the one or more applications related to the second application; execute each respective search query from the respective search queries to retrieve the respective set of objects from data of a corresponding application from the one or more applications related to the second application.

Clause 19. The non-transitory computer-readable storage medium of any one of clauses 16-18, wherein the one or more applications related to the second application comprises at least two applications related to the second application, and wherein the instructions that cause the at least one processor to generate the content page for the first application comprise instructions associated with the first application that, when executed, cause the at least one processor to generate, based at least in part on the respective sets of objects for the at least two applications related to the second application, the content page for the first application including at least one graphical indication of at least one object from the respective sets of objects for each application from the at least two applications related to the second application.

Clause 20. The non-transitory computer-readable storage medium of any one of clauses 16-19, wherein the instructions associated with the first application, when executed, further cause the at least one processor to: receive an indication of user input selecting a first graphical indication of a first object from the one or more graphical indications of the at least one object included in the content page for the first application; and send instructions to the second application to perform a function utilizing the first object.

Clause 21. A computing device configured to perform any of the methods of clauses 1-12.

Clause 22. A computing device comprising means for performing any of the methods of clauses 1-12.

Clause 23. A computer-readable storage medium encoded with instructions for causing one or more programmable processors to perform any of the methods or clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   receiving, by a first application executing at a computing device, information associated with a content page output by a second application executing at the computing device, wherein at least a first portion of the content page output by the second application is included in a first graphical user interface of the computing device;
   determining, by the first application and based on the information associated with the content page output by the second application, a context of the second application;
   sending, by the first application and based at least in part on the context of the second application, a respective search query to each of one or more applications to retrieve a respective set of objects, wherein one or more applications are related to the second application and execute at the computing device, and wherein the one or more applications are different than the first application and the second application;
   generating, by the first application and based at least in part on the respective sets of objects, a particular content page for the first application including one or more graphical indications of at least one object from at least one of the respective sets of objects; and
   while at least a second portion of the content page is output for display by the second application in the first graphical user interface of the computing device, outputting, by the first application, for display within a second graphical user interface of the computing device that is adjacent to the first graphical user interface, at least a portion of the particular content page for the first application.

2. The method of claim 1, wherein determining the context of the second application comprises:
identifying, by the first application, one or more content objects in the content page output by the second application;
extracting, by the first application, at least one respective property of each of the one or more content objects; and
determining, by the first application and based at least in part on one or more properties of the at least one respective property of each of the one or more content objects, the context of the second application.

3. The method of claim 2, wherein the one or more content objects include one or more of text, images, metadata, an application state, application code, field identifiers, file names, or file types.

4. The method of claim 1, wherein sending the respective search query to each of the one or more applications to retrieve the respective set of objects comprises:
constructing, by the first application and based on the context, the respective search query for each of the one or more applications related to the second application; and
executing, by the first application, each respective search query from the respective search queries to retrieve the respective set of objects from data of a corresponding application of the one or more applications related to the second application.

5. The method of claim 1,
wherein the one or more applications related to the second application comprises at least two applications related to the second application, and
wherein generating the particular content page for the first application comprises generating, by the first application and based at least in part on the respective sets of objects for the at least two applications related to the second application, the particular content page for the first application including at least one graphical indication of at least one object from the respective sets of objects for each application from the at least two applications related to the second application.

6. The method of claim 1, further comprising:
receiving, by the first application, an indication of user input selecting a first graphical indication of a first object from the one or more graphical indications of the at least one object included in the particular content page for the first application; and
sending, by the first application, instructions to the second application to perform a function utilizing the first object.

7. The method of claim 1, further comprising:
receiving, by the first application, an indication of a selection of one or more graphical indications representing one or more content objects included in the content page of the second application;
determining, by the first application and based on the one or more content objects, an updated context of the second application;
determining, by the first application and based at least in part on the updated context of the second application, a respective updated set of objects for each of the one or more applications related to the second application;
generating, by the first application and based at least in part on the respective updated sets of objects, an updated content page for the first application including one or more graphical indications of at least one object from at least one of the respective updated sets of objects; and
while at least a third portion of the content page is output for display by the second application in the first graphical user interface, outputting, by the first application, for display within the second graphical user interface, a portion of the updated content page for the first application.

8. The method of claim 1, wherein outputting the portion of the particular content page for the first application comprises:
while at least the second portion of the content page is output for display by the second application in the first graphical user interface, replacing, by the first application, a portion of the second graphical user interface with the portion of the particular content page for the first application.

9. The method of claim 1, wherein the particular content page for the first application that is output for display includes one or more graphical indications of at least one object from a first set of objects for an application from the one or more applications related to the second application, the method further comprising:
receiving, by the first application, an indication of user input selecting a different application from the one or more applications related to the second application;
generating, by the first application, based at least in part on the respective sets of objects, an updated content page for the first application including one or more graphical indications of at least one object from a second set of objects for the different application from the one or more applications related to the second application; and
while at least the second portion of the content page is output for display by the second application in the first graphical user interface, outputting, by the first application, for display within the second graphical user interface, a portion of the updated content page for the first application.

10. The method of claim 1, further comprising:
prior to determining the context, receiving, by the computing device, an indication of user input to begin executing the first application; and
responsive to receiving the indication of user input, determining, by the first application, the context.

11. A computing device comprising:
at least one processor; and
a memory that stores instructions associated with a first application that, when executed, cause the at least one processor to:
receive information associated with a content page for a second application executing at the computing device, wherein at least a first portion of the content page output by the second application is included in a first graphical user interface of the computing device;
determine, based on the information associated with the content page output by the second application, a context of the second application;
send, based at least in part on the context of the second application, a respective search query to each of one or more applications to retrieve a respective set of objects, wherein one or more applications are related to the second application and execute at the computing device, and wherein the one or more applications are different than the first application and the second application;

generate, based at least in part on the respective sets of objects, a particular content page for the first application including one or more graphical indications of at least one object from at least one of the respective sets of objects; and while at least a second portion of the content page is output for display by the second application in the first graphical user interface of the computing device, output, for display within a second graphical user interface of the computing device that is adjacent to the first graphical user interface, at least a portion of the particular content page for the first application.

12. The computing device of claim 11, wherein the instructions that cause the at least one processor to determine the context of the second application comprise instructions associated with the first application that, when executed, cause the at least one processor to:

identify one or more content objects in the content page output by the second application, wherein the one or more content objects include one or more of text, images, metadata, an application state, application code, field identifiers, file names, or file types;

extract at least one respective property of each of the one or more content objects; and determine, based at least in part on one or more properties of the at least one respective property of each of the one or more content objects, the context of the second application.

13. The computing device of claim 11, wherein the instructions that cause the at least one processor to send the respective search query to each of the one or more applications to retrieve the respective set of objects comprise instructions associated with the first application that, when executed, cause the at least one processor to:

construct, based on the context, the respective search query for each of the one or more applications related to the second application;

execute each respective search query from the respective search queries to retrieve the respective set of objects from data of a corresponding application of the one or more applications related to the second application.

14. The computing device of claim 11, wherein the one or more applications related to the second application comprises at least two applications related to the second application, and wherein the instructions that cause the at least one processor to generate the particular content page for the first application comprise instructions associated with the first application that, when executed, cause the at least one processor to generate, based at least in part on the respective sets of objects for the at least two applications related to the second application, the particular content page for the first application including at least one graphical indication of at least one object from the respective sets of objects for each application from the at least two applications related to the second application.

15. The computing device of claim 11, wherein the instructions associated with the first application, when executed, further cause the at least one processor to:

receive an indication of user input selecting a first graphical indication of a first object from the one or more graphical indications of the at least one object included in the particular content page for the first application; and send instructions to the second application to perform a function utilizing the first object.

16. A non-transitory computer-readable storage medium storing instructions associated with a first application that, when executed, cause at least one processor of a computing device to:

receive information associated with a content page for a second application executing at the computing device, wherein at least a first portion of the content page output by the second application is included in a first graphical user interface of the computing device;

determine, based on the information associated with the content page output by the second application, a context of the second application;

send, determine, based at least in part on the context of the second application, a respective search query to each of one or more applications to retrieve a respective set of objects, wherein one or more applications are related to the second application and execute at the computing device, and wherein the one or more applications are different than the first application and the second application;

generate, based at least in part on the respective sets of objects, a particular content page for the first application including one or more graphical indications of at least one object from at least one of the respective sets of objects; and while at least a second portion of the content page is output for display by the second application in the first graphical user interface of the computing device, output, for display within a second graphical user interface of the computing device that is adjacent to the first graphical user interface, at least a portion of the particular content page for the first application.

17. The non-transitory computer-readable storage medium of claim 16, wherein the instructions that cause the at least one processor to determine the context of the second application comprise instructions associated with the first application that, when executed, cause the at least one processor to:

identify one or more content objects in the content page output by the second application, wherein the one or more content objects include one or more of text, images, metadata, an application state, application code, field identifiers, file names, or file types;

extract at least one respective property of each of the one or more content objects; and determine, based at least in part on one or more properties of the at least one respective property of each of the one or more content objects, the context of the second application.

18. The non-transitory computer-readable storage medium of claim 16, wherein the instructions that cause the at least one processor to send the respective search query to each of the one or more applications to retrieve the respective set of objects comprise instructions associated with the first application that, when executed, cause the at least one processor to:

construct, based on the context, the respective search query for each of the one or more applications related to the second application;

execute each respective search query from the respective search queries to retrieve the respective set of objects from data of a corresponding application of the one or more applications related to the second application.

19. The non-transitory computer-readable storage medium of claim 16,
    wherein the one or more applications related to the second application comprises at least two applications related to the second application, and
    wherein the instructions that cause the at least one processor to generate the particular content page for the first application comprise instructions associated with the first application that, when executed, cause the at least one processor to generate, based at least in part on the respective sets of objects for the at least two applications related to the second application, the particular content page for the first application including at least one graphical indication of at least one object from the respective sets of objects for each application from the at least two applications related to the second application.

20. The non-transitory computer-readable storage medium of claim 16, wherein the instructions associated with the first application, when executed, further cause the at least one processor to:
    receive an indication of user input selecting a first graphical indication of a first object from the one or more graphical indications of the at least one object included in the particular content page for the first application; and
    send instructions to the second application to perform a function utilizing the first object.

* * * * *